United States Patent Office 3,397,062
Patented Aug. 13, 1968

3,397,062
MAPLE PRODUCT FOR BEVERAGE, FLAVORING
AND THE LIKE
Raymond S. Nessly, 144 N. Marshall St.,
York, Pa. 17402
No Drawing. Filed Oct. 13, 1964, Ser. No. 403,657
2 Claims. (Cl. 99—28)

ABSTRACT OF THE DISCLOSURE

A liquid maple product for use as a beverage, flavoring material, and the like, concentrated from natural maple syrup to have a Brix rating preferably between approximately 8° and 45°.

This invention pertains to maple products made from natural maple sap and capable of being employed as a beverage, flavoring for many types of foods, and the like, details of which are set forth hereinafter.

For many years, it has been known that the sap of the hard or sugar maple trees, known as winter sap, could be concentrated very substantially from its original, very watery and only slightly sweet condition to well known maple syrup which, when further boiled, finally reaches crystalline stage wherein the product is maple sugar. These two products however are the only ones which thus far have ever been considered as being capable of production from natural maple sap.

The winter sap which is used in the making of maple syrup and maple sugar is obtained from sugar maple trees during a relatively short season of approximately five or six weeks occurring in early spring while the nights are still very cold but the days are warm and induce the rising of the sap in the trunk of the tree. Upon the trunk being tapped at a limited number of locations, usually from one to four, the water-like very slightly sweet sap runs from the tapped holes into suitable containers from which the contents are gathered periodically or, in more modern techniques, the sap flows through flexible plastic tubing to suitable tanks or the like from which the sap is taken to the "sugar house" where it is "boiled down" to a very low percentage of its original volume.

The sugar content of maple sap will vary between trees and appears to depend upon particular trees, the soil, the weather and particularly the temperature, the nearness of the trees to other trees and especially the amount of foliage on an individual tree, the amount of moisture in the soil, and various other factors. In view of wide variations in these factors even in a single grove of maple trees, the amount of sap required to produce a single gallon of maple syrup will vary approximately between 25 and 55 gallons, whereby it will be seen that an average of approximately 40 gallons of sap is required to produce a single gallon of syrup.

Maple syrup status is determined by the Brix rating which is directly related to the specific gravity thereof. Maple syrup of acceptable commercial quality must have a Brix rating of at least substantially between 65.5° and 67°. The natural maple sap from which the syrup is made usually will have a Brix rating of between approximately 1.5° and 6°. Some very unusual trees are known to produce sap having a Brix rating of as high as 10° but trees of this capacity are extremely rare. About 2° Brix is average. From the foregoing, it will be seen that a very substantial amount of concentration of the natural maple sap is necessary in order to produce maple syrup and even further concentration is required to produce maple sugar from such syrup.

According to modern techniques in producing maple syrup, particularly when the sap is in its natural stage and of a very watery consistency, the sap is boiled quite rapidly so as to reduce the water content thereof to a lower percentage in as short a period of time as possible. By way of specific example, assuming that the Brix rating of the raw sap is about 2°, substantially between 40 and 42 gallons of raw sap will be required to produce a gallon of syrup having a Brix rating of between 65.5° and 67° which, incidentally, will weigh approximately eleven pounds. If this syrup is concentrated still further to produce maple sugar, a gallon of syrup produces substantially between 8 and 8½ pounds of sugar.

Usually a total of about 90 minutes time is required to boil down the required quantity of raw maple sap to produce a gallon of maple syrup. During the first thirty minutes of this time, the original quantity of sap is reduced to approximately 2 gallons of concentrate, having a Brix rating of approximately 45°. This material may be considered a relatively thin syrup and in reducing the same to half that quantity, or a gallon of syrup of 65.5° Brix, the boiling must be done very carefully to prevent burning or charring of the syrup. Accordingly, said final reduction or concentration of approximately 2 gallons of reduced sap to 1 gallon of finished syrup requires approximately one hour in time.

In addition to the time consumed to reduce natural maple sap to commercial maple syrup consistency, the fuel cost is not inconsequential. In the more modern maple syrup and sugar manufacturing establishments at present, fuel oil and gas are used as sources of heat. Based upon a cost of approximately 15¢ per gallon of fuel oil, and also considering the criterion that approximately 1 gallon of fuel oil is required to evaporate 12 gallons of water from maple sap in reducing the sap to syrup consistency, the fuel cost of producing maple syrup by the use of fuel oil under the foregoing circumstances will amount approximately to 37¢ per gallon of syrup. If the sap is purchased, the cost thereof is in addition to the fuel cost.

In the production of maple syrup or maple sugar from natural maple sap, it is known that while the maple sap has a very weak but discernible sweet flavor, it has no maple flavor in such raw state. The maple flavor appears to be developed from the lignin content of the maple sap and said flavor begins to develop at a very early stage in the boiling process employed to concentrate the sap to syrup stage. Incident to the development of the maple flavor, the characteristic color of maple syrup commences to appear in the mass of liquid being boiled. Also, while it is known that of the solid content of maple syrup, all but two or three percent thereof is sugar, primarily sucrose, there nevertheless is present in the raw sap rather substantial percentages by weight of various minerals, organic acids, and proteins. In the mineral content, the principal constituents are potassium, calcium, silicone oxide, manganese, sodium, and magnesium. Of these, potassium is by far the greatest, calcium next, and sodium among the least with magnesium usually only being present in trace form.

During the boiling process, a very substantial percentage of these minerals precipitate out in granular form which is known in the industry as sugar "sand" in that the material very closely resembles beach sand. Such sand content is filtered from the completed syrup, either during the boiling process or when the concentrated mass has been reduced to acceptable syrup consistency. Much of the mineral content of the original sap therefore is lost in the reduction of the same to syrup or sugar form and a number of these minerals have dietary and various health benefits to humans. At present however, such sand is insoluble in water and syrup, whereby it now is discarded in the industry as waste when separated from the completed syrup. As a conservative estimate, a minimum of one pound of such sand results from the production of each gallon of syrup and the average production of sand per gallon of syrup is higher.

It is one of the principal objects of the present invention to utilize maple sap more economically and for a wider range of products than heretofore has been undertaken, especially for beverage and food purposes, particularly by utilizing the sap for such purposes when it has been concentrated through the application of heat from approximately 10° Brix to substantially 65° Brix, depending upon the specific purpose for which the concentrated sap is to be used as explained in detail hereinafter and particularly for purposes of making available for human consumption the valuable minerals and other contents of the natural maple sap preserved in the product to as high an extent as possible; also to reduce the time required, and consequently effect a saving in fuel costs, to produce commercially valuable beverage liquids and flavoring solutions of various concentrations highly useful in many food processing operations.

It is another object of the invention to produce the foregoing products to increase the utilization and consumption of maple sap as a valuable commercial commodity and thereby render productive a far greater extent of available sugar maple trees and provide corresponding employment as well as agricultural income to far greater numbers of people than the present maple syrup and maple sugar industry are affording.

It is still another object of the invention to utilize greater quantities of maple sap than presently are being made use of for beverage and food purposes principally by only partially processing the same in comparison with the processing operations presently required to form maple syrup and maple sugar, and thereby produce beverage and flavoring liquids capable of being maintained useful over long periods of time through sterilizing the product incident or prior to bottling or otherwise placing the product in hermetically sealed containers, such products as are used for beverages also being capable of being rendered more palatable to the taste by some individuals by the employment of carbonation.

Details of the foregoing objects and of the invention, as well as other objects thereof, are set forth in the following specification.

At the present time in this country alone, only a relatively small percentage of the available sugar maple trees are being exploited for the value of their sap production, notwithstanding the fact that very extensive tracts and grooves of suitable sugar maple trees exist in many states extending from Maine to Wisconsin in the north and in a southerly direction generally into the Appalachian range of mountains in which latter area it is estimated that only approximately slightly over 1% of the sugar maple trees are being harvested for their sap content. In a region such as this where agricultural income is of a very low order in such mountain regions, expansion of the harvesting of sugar maple sap and conversion thereof into various kinds of beverage and flavoring products would be highly beneficial to the economy of the region. Also, as previously harvested, though the season was relatively short, the gathering of the maple sap and the processing thereof into syrup and sugar requires very substantial use of manual effort, in cold wether and under generally uncomfortable conditions. The farmers presently engaged in this pursuit are aging and the younger people have left for other employment. Many of the older farmers are no longer physically able to perform the tasks of harvesting the sap and processing it and present renumeration is not sufficient to hire labor to do it.

This situation usually leads to selling the timber for logging operations and this substantially strips the land bare. Such ruthless cutting of timber upsets conservation efforts and increases the instability of the regional water supply. Also, as a maple orchard, living trees are more valuable than lumber cut therefrom because, even at the present relatively low levels of utilization of maple sap, the sale thereof will yield the price of the trees as timber in about five to seven years, and sap production continues indefinitely.

In accordance with the principles of the present invention, it has been discovered that when raw maple sap, regardless of how low a Brix rating, is concentrated by heat, such as by boiling, until it has a Brix rating of approximately 9° or 10°, the color is changed from water white or crystal clear to an attractive pale amber color. A definite, though delicate distinctly maple flavor also is developed, and the sweetness has been increased to such a degree that it is acceptable as a sweetened beverage. To preserve the beverage in this condition however, it is necessary to either pasteurize or sterilize the same such as by raising to a temperature of approximately 180° F. and then immediately hermetically sealing the same in a suitable container such as a bottle or jar, metal can or the like.

The taste buds of the human tongue are excited more actively by a beverage if the same is carbonated. Carbonated beverages also have a tendency to be more invigorating, in general, than non-carbonated beverages. Accordingly, the maple beverage of the consistency referred to above is renderd even more palatable by being carbonated, the carbonation being effected, for example, by passing the above-described partially concentrated and developed sap through a conventional beer carbonater and continuing the carbonation until an acceptable degree is reached to render the beverage highly palatable.

The Brix rating for the above-described beverage can be considered substantially minimum. According to the tastes of some individuals, a beverage of such Brix rating might be regarded as not having as intense a maple flavor as is desired or expected to be present in a maple flavored beverage. Under such circumstances, and in accordance with the principles of the invention, raw maple sap may be concentrated until it has a higher Brix rating, such as, for example, of the order of between 15° and 20°. However, it is to be borne in mind that as the raw sap is concentrated from its initial raw state, a gradual increase in the production of maple "sand" occurs, whereby the desirable, healthful, and nutritious natural minerals and other beneficial elements in the raw sap are precipitated from the same and, upon being filtered out, are lost to the product and consumer. In order to constitute a commercially acceptable beverage, it is necessary to remove such "sand" formed in the sap as a result of concentration thereof to the degree desired for beverage purposes. The "sand" content usually is directly proportional to the degree of concentration. Accordingly, the lower the Brix rating of the concentrated sap, the greater will be the amount of the natural minerals and other ingredients of the raw sap which will remain therein and not be precipitated out. These minerals and other ingredients also are in a readily assimilable form so as to be of benefit to humans when the beverage or other maple products are consumed.

From a dietary standpoint, it is to be noted that among the mineral constituents in natural raw sap, there is a relatively high percentage of potassium and a correspondingly low percentage of sodium. For example, in the analysis of one typical sample of maple sap, .26% of potassium was present, while only .003% of sodium was present. Such disparity in the presence of these two metals, which are present in the form of salts, is highly beneficial to persons having dietary conditions. Further, the mild sugar content of sap condensed to about 20° Brix is highly beneficial as a hunger deterrent if about 6 or 8 liquid ounces are consumed about fifteen minutes before dining.

Of even greater possible importance to the above-described presence of potassium and sodium, is the presence of calcium which, in the aforementioned sample, was present to the extent of .07% by weight and, considering all the solids present in the sample, based upon dry weight, .11% of calcium was present. Said calcium also is available in the sap in a readily assimilable form.

Considering the fact that between one and two pounds of maple "sand" are removed, for example, from approximately 40 gallons of raw sap of about 2° Brix to produce a single gallon of maple syrup weighing approximately 11 pounds, and since it is estimated that there is still available in regular commercial quality maple syrup of 65.5° to 67° Brix rating enough calcium substantially to equal that present in a similar quantity of raw milk, it readily can be visualized that in the raw sap which was concentrated to make said gallon of syrup, a far greater quantity of calcium is present. As a result, it can be seen that either the raw sap or partially concentrated sap having relatively low Brix ratings, such as of the order of between 10° and 20° Brix, have had very little of the available minerals precipitated therefrom, whereby most of the natural minerals and other beneficial ingredients in the sap are still present in such beverage, in readily assimilable form, for human consumption and corresponding nutrition and dietary benefits. From this, it also can be seen that the dilution of maple syrup with water in an effort to reconstitute raw sap can not be achieved because of the irreplaceable substantial quantities of minerals and organic chemicals removed in the "sand." Also, any such diluted syrup lacks the original flavor and aroma of natural sap, due probably to the loss of volatile sap component evaporated in boiling the sap to produce syrup at high temperatures and for substantial periods of time.

Another field in which the raw maple sap can be used to substantial advantage when only partially concentrated from the raw state to the maple syrup Brix rating is that of constituting the syrup vehicle in various canned fruits, notably canned peaches, pears, plums and the like, the flavor of which is greatly enhanced by the addition of the delicate maple flavor to complement the natural fruit flavor, thereby producing a somewhat spicy, tangy taste in the canned fruit. This transforms conventional fruit into a gourmet type product capable of commanding higher prices than the corresponding fruit canned in normal sugar syrups due to having more appealing flavor than such conventional syrup affords.

To render the maple sap suitable for such canned fruit flavoring uses, the concentration of the raw sap may be extended to a relatively wide range of Brix ratings, for example, possibly between as wide a range as 10° and 45° Brix, depending upon the concentration of maple flavor desired in the canned product. Also, it is to be understood that the exemplary identity of canned fruit set forth above is not to be considered restrictive but merely illustrative in that there are many other types of fruit susceptible to having the flavor thereof enhanced by being canned or otherwise preserved in concentrated maple sap having a desired, palatable Brix rating.

Still another type of beverage product capable of being formed in accordance with the principles of the present invention is to use the raw maple sap as obtained from the trees or concentrate the raw maple sap to a Brix rating of the order of between 10° and 20° Brix, for example, with a view to maintaining the original mineral content as abundant as possible, and then intensify the maple flavor and sweetness thereof by the addition thereto of either commercial grade maple syrup or intensified maple syrup of the type described in Willits' U.S. Patent No. 2,895,833. Such fortifying syrup may be added to the raw or slightly concentrated sap within ranges of between 5 and 25% by weight of the bevarege, for example, depending upon the fortified concentration of maple flavor and increased sweetness which is desired to be present in the beverage.

By producing such a fortified beverage, in which the added fortification increases primarily the maple flavor and sweetness of the beverage, the relatively higher percentage of natural minerals and other nutrients present in the beverage prior to being fortified are available in addition to the limited percentage of similar minerals and nutrients present in the maple syrup which is added to the beverage to fortify principally the flavor and sweetness thereof.

The foregoing examples of beneficial use of maple sap, either in the original raw state, or when condensed to various degrees up to the consistency of maple syrup at 65.5° to 67° Brix, illustrate substantial potential for the expansion of the use of such sap over the very limited uses now made which substantially are only for the manufacture of maple syrup, maple sugar and maple sugar products. Though some limited uses have been developed with respect to intensified maple flavorings and the like as referred to in the foregoing in connection with Willits Patent No. 2,895,833, it does not appear that such use has been extensive. To illustrate still further in greater detail additional uses of maple sap either in the raw state or concentrated to various extents up to approximately 65° Brix, the following uses are additional exemplary illustrations which are to be understood as being within the contemplation of the present invention and to minimize such description, the raw or concentrated maple sap employed in such uses is divided into three principal categories in accordance with the following headings:

RAW OR LIGHTLY PROCESSED MAPLE SAP

Under this category, the untreated, raw maple sap or raw sap which has been concentrated up to approximately 10° Brix, is considered and is designated as "thin" sap. It is suitable for the following uses in addition to those designated hereinabove.

In home cooking, such raw sap or thin syrup is useful to promote palatability of prepared foods by basting various meats and fowl while being roasted with the same. Similarly, it may be used in lieu of water in preparing verious baked products such as bread, cakes, and pastry in general, when employing either pre-mixed packaged materials which are presently prevelant, or when assembled in accordance with a given recipe, as well as being used as the liquid constituent of many different types of desserts. Similarly, such raw sap or syrup may be used in lieu of water in reconstituting de-hydrated foods such as potatoes and especially sweet potatoes, soups, milk crystals and the like, as well as being used in lieu of water to form meat or vegetable broth as in stews, soups, and the liquid cooking of vegetables.

In unprepared state and as bottled or otherwise packaged, such raw sap or lightly processed syrup is highly suitable as a breakfast drink or a beverage at any other time. The same also is highly useful as a mixer for alcoholic beverages.

MEDIUM PROCESSED SAP

Under this category, raw sap which has been processed to the degree desired and ranging, for example, from approximately 10° Brix to 45° Brix, is considered medium syrup and includes substantially the full range between such limits.

Such medium syrup is highly useful in various home uses, encompassing all of those recited above with respect to raw and lightly processed sap. In addition, medium processed sap, of about 20° Brix for example, has substantially dietary value particularly in ragard to being an aid to reducing weight of human beings. In this consistency, the processed sap, which actually is a very thin syrup, not only has food and health values in regard to the mineral and organic chemical constituents of the syrup but, as referred to above, the mild sugar content substantially reduces the sensation of hunger if 6 or 8 liquid ounces thereof are consumed about 15 minutes prior to dining.

Further highly beneficial uses for this type of maple product are; as a starter for yeast in lieu of thin syrup made from sugar and water; a starting material for conversion into exotic vinegars of special type comparable to fruit vinegars; and as a mixer of a heavier nature than the raw or thin syrup for alcoholic beverages.

HEAVY PROCESSED SAP

Under this heading, raw sap which has been processed to have a concentration of between approximately 45° and 65° Brix is considered, including all ratings therebetween. In this category, the product, in accordance with the taste of the individuals to consume the same, may be used for all of the so-called home uses described above with respect to the raw sap or thin syrups and medium processed syrups set forth above. In addition however, there are further important uses which are most capably served by such relatively heavy processed sap, the upper ranges of which closely approach commercial maple syrup. These uses essentially can be considered industrial although, under certain circumstances, they could be used under so-called home conditions. One such use is as an ingredient of savory broth used in preparing bolognas of many different types, frequently referred to as "cold cuts," as well as in the production of similar food stuffs in which flavoring is highly essential, such as scrapple, country pudding, sausages, and the like.

Another so-called industrial use comprises utilizing such syrup as food for bees, as a substitute, for example, for the various nectars of flowers consumed by bees incident to producing honey. Particularly in dry weather when blooming flowers are scarce, it is not uncommon for bee keepers to prepare thin syrup from sugar and water to sustain hives of bees. By using syrup of the type described above and exposing the same to bees, an entirely new flavor of honey is produced. It is to be understood that this contemplated use is not as a flavoring additive to the honey. Rather, the bees digest such syrup and convert the maple sap into a true honey having a maple flavor.

INDUSTRIAL USE OF MAPLE SAP

In this category, thhe material used solely for industrial purposes in accordance with the principles of the invention encompasses the full range from raw sap to process syrup concentrated approximately to 65° Brix. Depending upon the concentration of the raw or processed sap desired in the product, the same find relatively wide uses in the curing of tobaccos, as a major ingredient of prepared cocktail mixes, as a prepared mixer for hard liquors to be used in highballs, cocktails and the like, and also as a moistening agent in commercial candies, cream and the like.

From the foregoing, it will be seen that the present invention provides a very wide range of additional uses for raw maple sap and various ranges of concentration thereof, up to approximately 65° Brix for example, all of which uses are in addition to the conventional maple syrups and sugars which have been known for many years but which additional uses have not heretofore been known or utilized. One of the salient advantages of the maple products envisioned by the present invention is the maintaining of as high a percentage as possible of the natural minerals and organic chemicals, which have nutritive and dietary benefits to humans, in the liquid maple product rather than precipitate the same as has customarily been done in the form of sugar "sand" which is discarded as useless and therefore all such "sand" is entirely lost from the product, especially conventional maple syrup and maple sugar which retain the least percentage of natural minerals and organic chemicals of all the maple products described hereinabove.

While the invention has been described and illustrated in its several preferred embodiments, it should be understood that the invention is not to be limited to the precise details herein illustrated and described since the same may be carried out in other ways falling within the scope of the invention as claimed.

I claim:
1. A maple beverage product concentrated from natural maple sap and having a natural maple flavor and a Brix rating between approximately 10° and 45°, said beverage being carbonated to enhance the palatability thereof.

2. A maple beverage and flavoring product concentrated from natural raw maple sap and having a natural maple flavor and a desired Brix rating within the range between approximately 8° and 45° fortified after such concentration thereof by the addition thereto of between 5% and 25% by weight of maple syrup having a Brix rating of at least approximately 65° to intensify the maple flavor of the product while providing therein a high percentage of the natural minerals originally in the raw sap from which the product was concentrated, said minerals being in readily assimilable form as beneficial nutrients for human consumption.

References Cited

UNITED STATES PATENTS

| | | | |
|---|---|---|---|
| 2,054,873 | 9/1936 | Whitby | 99—142 X |
| 2,718,469 | 9/1955 | Eskew et al. | 99—142 |
| 2,880,094 | 3/1959 | Naghski et al. | 99—142 |

OTHER REFERENCES

"Agriculture Handbook No. 134," Maple Sirup Producers Manual, U.S. Dept. Agriculture, January 1958, pp. 14 and 16.

MAURICE W. GREENSTEIN, *Primary Examiner.*